United States Patent
Sung et al.

(10) Patent No.: US 8,596,082 B2
(45) Date of Patent: Dec. 3, 2013

(54) REFRIGERATOR AND THE CONTROLLING METHOD

(75) Inventors: Ji Won Sung, Seoul (KR); Chan Ho Chun, Seoul (KR); Yong Hwan Eom, Seoul (KR)

(73) Assignee: LG Electronics Inc., Seoul (KR)

( * ) Notice: Subject to any disclaimer, the term of this patent is extended or adjusted under 35 U.S.C. 154(b) by 1036 days.

(21) Appl. No.: 12/593,699

(22) PCT Filed: Mar. 12, 2008

(86) PCT No.: PCT/KR2008/001394
§ 371 (c)(1),
(2), (4) Date: Nov. 5, 2009

(87) PCT Pub. No.: WO2008/120875
PCT Pub. Date: Oct. 9, 2008

(65) Prior Publication Data
US 2010/0063634 A1     Mar. 11, 2010

(30) Foreign Application Priority Data
Mar. 30, 2007    (KR) .................. 10-2007-0031661

(51) Int. Cl.
*F25B 49/02*     (2006.01)
(52) U.S. Cl.
USPC ............ 62/228.4; 62/228.1; 62/229; 700/278
(58) Field of Classification Search
USPC ................. 700/278; 62/228.1, 228.4, 229
See application file for complete search history.

(56) References Cited

U.S. PATENT DOCUMENTS

| | | | |
|---|---|---|---|
| 5,947,693 A * | 9/1999 | Yang | 417/45 |
| 7,100,387 B2 * | 9/2006 | Boer et al. | 62/228.5 |
| 2006/0130504 A1 * | 6/2006 | Agrawal et al. | 62/228.4 |

FOREIGN PATENT DOCUMENTS

| | | |
|---|---|---|
| KR | 10-1998-0028271 | 7/1998 |
| KR | 10-0332292 | 4/2002 |
| KR | 10-0451242 | 10/2004 |
| KR | 10-0631565 | 10/2006 |

OTHER PUBLICATIONS

International Search Report dated Jul. 1, 2008.

\* cited by examiner

*Primary Examiner* — Cheryl J Tyler
*Assistant Examiner* — Jonathan Bradford
(74) *Attorney, Agent, or Firm* — KED & Associates LLP

(57) ABSTRACT

There are provided a refrigerator and a method of controlling the same. When a difference between a temperature of an inside of a freezer compartment and a set temperature is referred to as a first error temperature and when a difference between a temperature of an inside of a refrigerator compartment and the set temperature is referred to as a second error temperature, the method of controlling a refrigerator includes varying stroke of an inverter linear compressor to operate the inverter linear compressor by a maximum output when the first or second error temperature is higher than a maximum output temperature and varying the stroke of the inverter linear compressor at least once in a freezer or refrigerator cycle one period to operate the inverter linear compressor when the first or second error temperature is no more than the maximum output temperature.

19 Claims, 8 Drawing Sheets

REFRIGERATOR AND THE CONTROLLING METHOD

TECHNICAL FIELD

The present invention relates to a refrigerator and a method of controlling the same, and more particularly, to a refrigerator operated by varying the stroke of an inverter linear compressor and a method of controlling the same.

BACKGROUND ART

In general, a compressor is a mechanical device that receives driving force from a driving force generator such as an electric motor and a turbine to compress the air, refrigerant, or various operation gases and to increase pressure and is widely used for electric home appliances such as a refrigerator and an air conditioner or all over the industry.

The compressor is divided into a reciprocating compressor that forms a compression space into which an operation gas is suctioned and from which an operation gas is discharged between a piston and a cylinder so that the piston linearly reciprocates to compress the refrigerant, a rotary compressor that forms the compression space into which the operation gas is suctioned and from which the operation gas is discharged between an eccentrically rotating roller and a cylinder so that the roller eccentrically rotates along the internal wall of the cylinder to compress the refrigerant, and a scroll compressor that forms a compression space into which the operation gas is suctioned and from which the operation gas is discharged between an orbiting scroll and a fixed scroll so that the orbiting scroll rotates in accordance with a fixed scroll to compress the refrigerant.

Recently, in the reciprocating compressor, an inverter linear compressor having a simple structure in which a piston is directly connected to a reciprocating motor that linearly reciprocates to improve compression efficiency without mechanical loss caused by motion conversion and having a free piston structure in which a connecting rod that restricts the motion of the piston does not exist unlike in the reciprocating compressor are being developed.

DISCLOSURE OF INVENTION

Technical Solution

In order to solve the above-described problems, it is an object of the present invention to provide a refrigerator, comprising an inverter circuit for supplying an operation control signal so that an inverter linear compressor is operated, a sensor unit comprising at least one sensor for measuring temperatures of insides of a freezer compartment and a refrigerator compartment, and a controller for supplying a control signal to the inverter circuit so that the stroke of the inverter linear compressor varies at least once in freezer or refrigerator cycle one period so that the inverter linear compressor is operated when a first error temperature of the freezer compartment or a second error temperature of the refrigerator compartment is no more than a maximum output temperature.

When a difference between a temperature of an inside of a freezer compartment and a set temperature is referred to as a first error temperature and when a difference between a temperature of an inside of a refrigerator compartment and the set temperature is referred to as a second error temperature, a method of controlling a refrigerator comprises varying stroke of an inverter linear compressor to operate the inverter linear compressor by a maximum output when the first or second error temperature is higher than a maximum output temperature and varying the stroke of the inverter linear compressor at least once in a freezer or refrigerator cycle one period to operate the inverter linear compressor when the first or second error temperature is no more than the maximum output temperature.

MODE FOR THE INVENTION

Hereinafter, a refrigerator according to the present invention and a method of controlling the same will be described in detail with reference to accompanying drawings.

Figure 1:
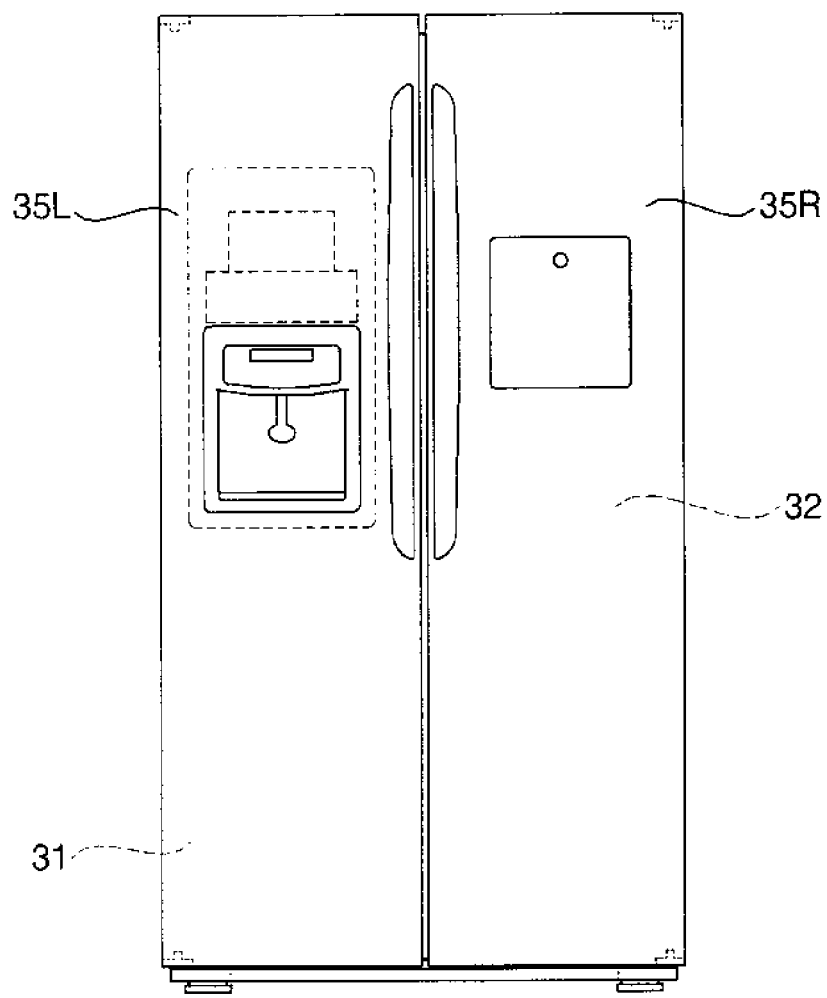
FIG. 1 is a front view illustrating a refrigerator according to a first embodiment of the present invention.
Figure 2:
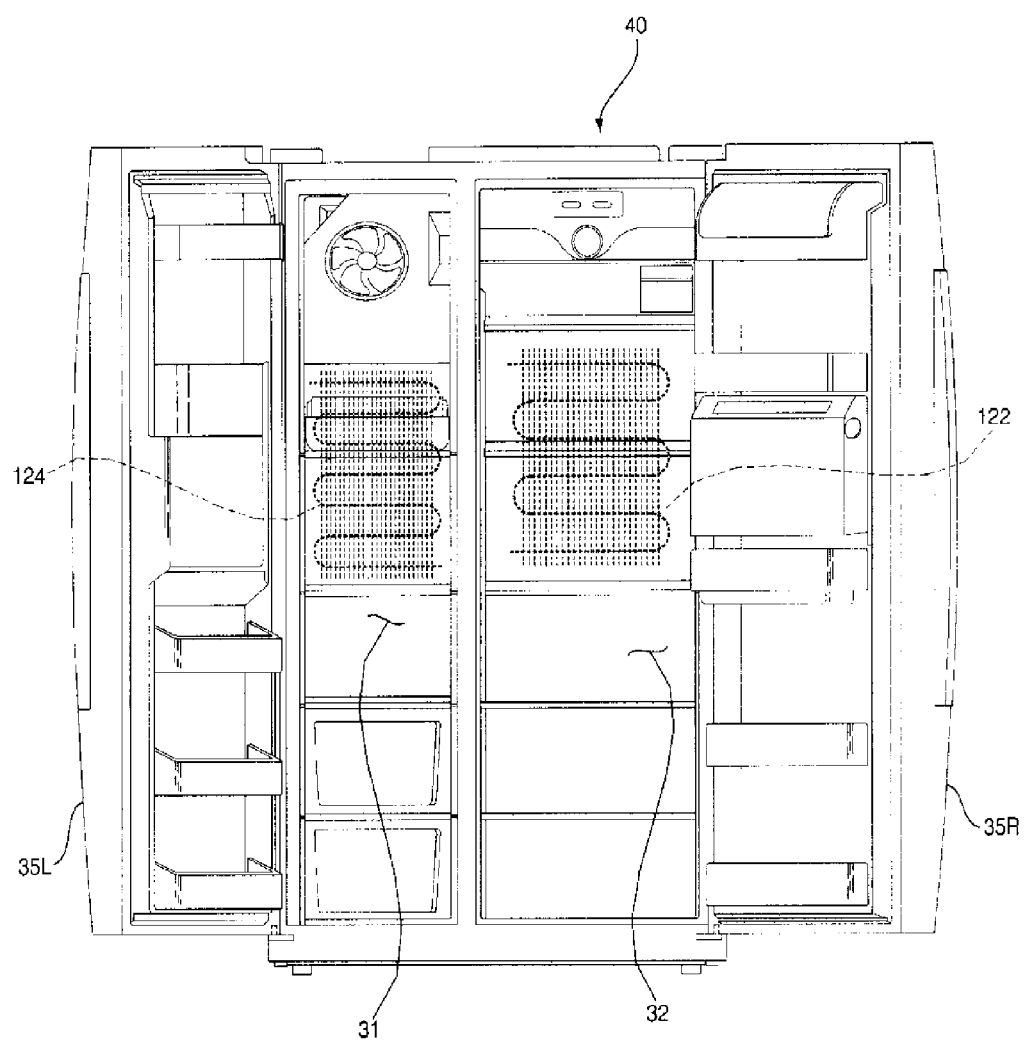
FIG. 2 is a front view illustrating the inside of the refrigerator of FIG. 1.

FIG. 1 is a front view illustrating a refrigerator according to a first embodiment of the present invention. FIG. 2 is a front view illustrating the inside of the refrigerator of FIG. 1.

Referring to FIGS. 1 and 2, the refrigerator includes a main body 41 including a freezer compartment 31 and a refrigerator compartment 32 and doors 35L and 35R connected to the main body 41 by a hinge to open and close the freezer compartment 31 and the refrigerator compartment 32.

Here, the freezer compartment 31 and the refrigerator compartment 32 are separated from each other so that chilled air does not flow due to a partition 33 provided in the main body 41 and a freezer compartment evaporator (not shown) and a refrigerator compartment evaporator (not shown) for cooling the freezer compartment 31 and the refrigerator compartment 32 are provided in the freezer compartment 31 and the refrigerator compartment 32.

Figure 3:
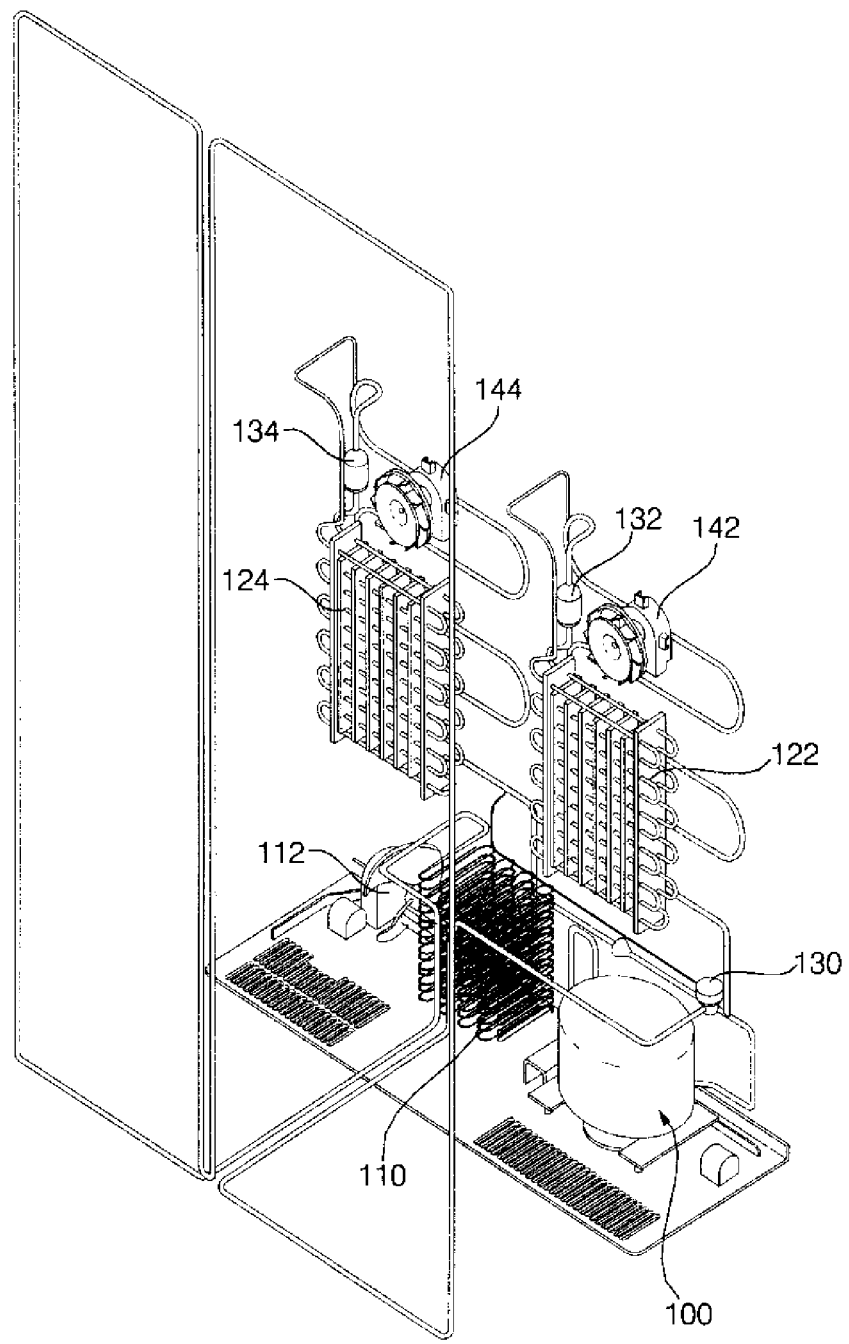
FIG. 3 is a perspective view illustrating the devices of the refrigerator of FIG. 1.
Figure 4:
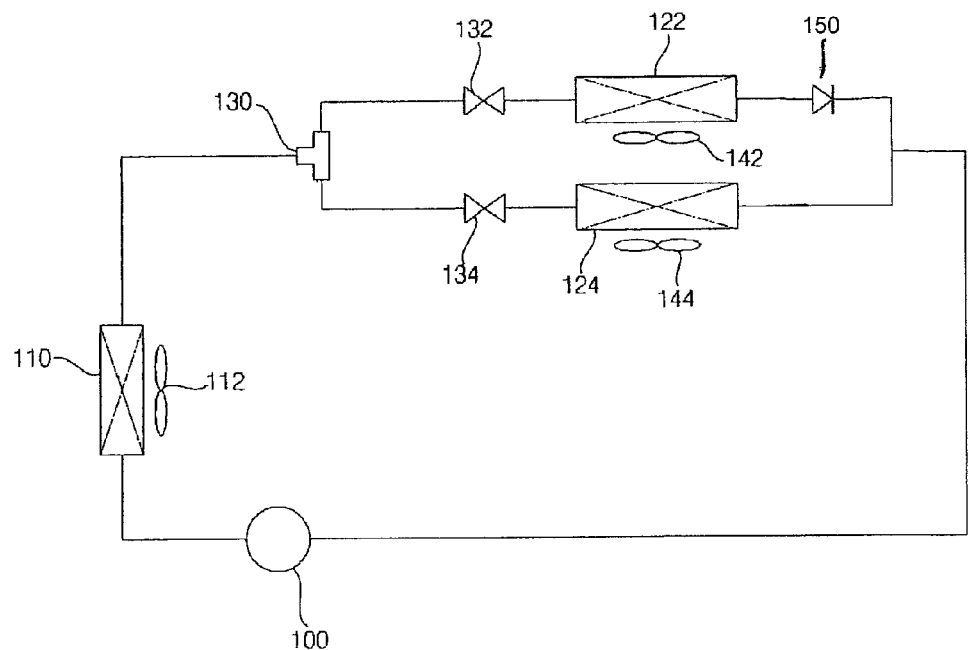
FIG. 4 is a block diagram schematically illustrating the structure of the devices of FIG. 3.

FIG. 3 is a perspective view illustrating the devices of the refrigerator of FIG. 1. FIG. 4 is a block diagram schematically illustrating the structure of the devices of FIG. 3.

Referring to FIGS. 3 and 4, the refrigerator includes a compressor 100, a condenser 110 for condensing refrigerant compressed by the compressor 100, a freezer compartment evaporator 124 provided in the freezer compartment 31 and a refrigerator compartment evaporator 122 provided in the refrigerator compartment 32 that receive the refrigerant condensed by the condenser 110 to evaporate the received refrigerant, a 3-way valve 130 for supplying the refrigerant condensed by the condenser 110 to the refrigerator compartment evaporator 122 or the freezer compartment evaporator 124, a refrigerator compartment expansion valve 132 for expanding the refrigerant supplied to the refrigerator compartment evaporator 122, and a freezer compartment expansion valve 134 for expanding the refrigerant supplied to the freezer compartment evaporator 124.

Here, a refrigerator compartment fan 142 for improving the heat exchange efficiency of the refrigerator compartment evaporator 122 and for circulating the air in the refrigerator compartment 32 is provided in the refrigerator compartment 32. In addition, a freezer compartment fan 144 for improving the heat exchange efficiency of the freezer compartment evaporator 124 and for circulating the air in the freezer compartment 31 is provided in the freezer compartment 31.

A check valve 150 for preventing the refrigerant of the freezer compartment evaporator 124 from being introduced is provided in the discharge side of the refrigerator compartment evaporator 122.

The 3-way valve 130 can selectively open and close the passage of the refrigerant supplied from the condenser 110 and can open or close one of the refrigerator compartment expansion valve 132 or the freezer compartment expansion valve 134.

Here, the passage of the refrigerator compartment of the 3-way valve 130 is referred to as a "R valve", the passage of the freezer compartment is referred to as an "F valve", the opening and closing of the passage of the refrigerator compartment is referred to as on/off of the R valve, and the opening and closing of the passage of the freezer compartment is referred to as on/off of the F valve.

On the other hand, in the present embodiment, the 3-way valve 130 is provided. However, the opening and closing valves can be provided in the pipes connected to the refrigerator compartment/freezer compartment evaporators 122 and 124 instead of the 3-way valve 130, which is not limited.

Figure 5:
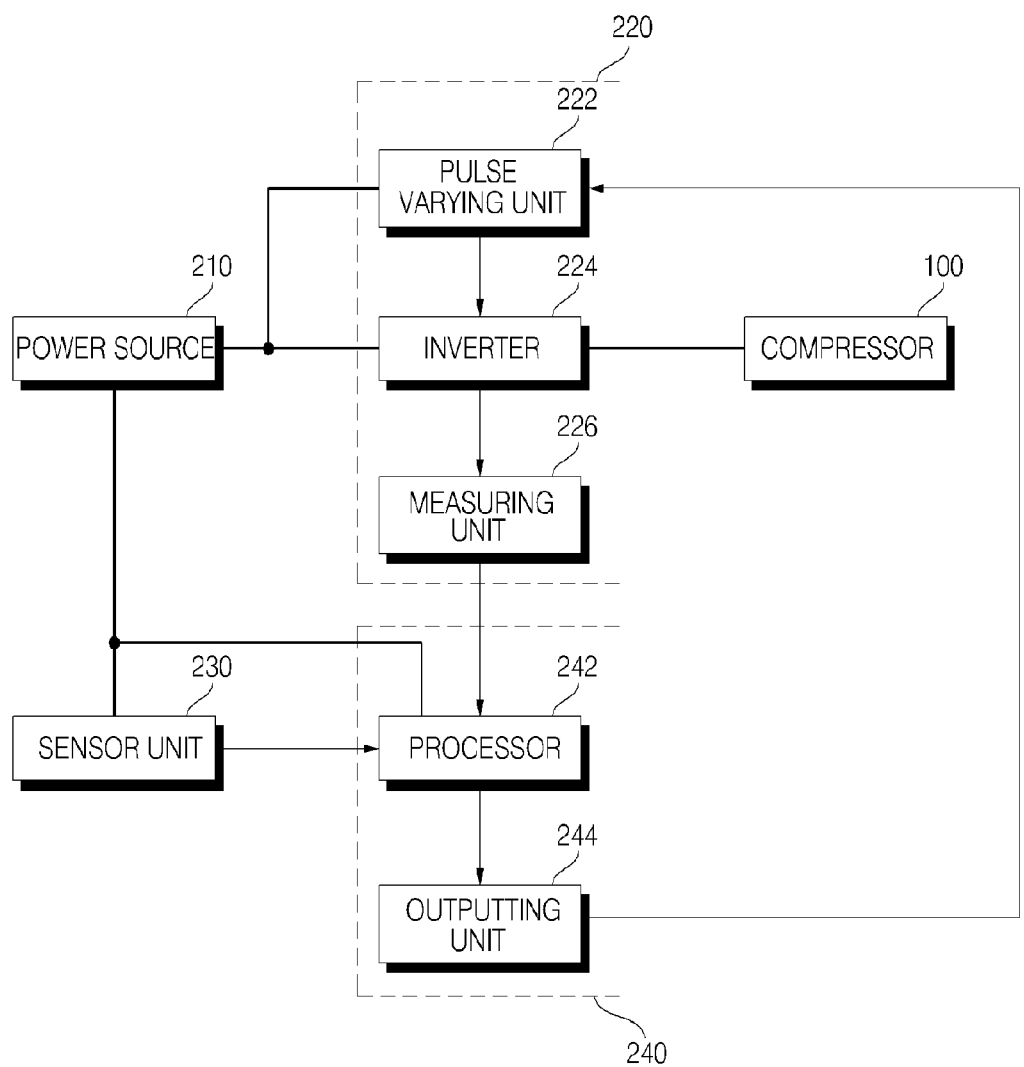
FIG. 5 is a block diagram of the controlling of the refrigerator according to the first embodiment of the present invention.

FIG. 5 is a block diagram of the controlling of the refrigerator according to the first embodiment of the present invention.

Referring to FIG. 5, the refrigerator includes a compressor 100, a power source 210 for rectifying an alternate current (AC) power source input from the outside through a bridge diode (not shown) or a rectifying device (not shown) and for smoothing a rectified direct current (DC) voltage, an inverter circuit 220 for supplying a operating control signal to the compressor 100 through the DC voltage supplied from the power source 210, a sensor unit 230 including at least one sensor for measuring the temperatures of the insides and the outsides of the freezer compartment 31 and the refrigerator compartment 32 by the DC voltage of the power source 210, and a controller 240 for controlling the inverter circuit 220 and the sensor unit 230.

Here, the compressor 100 is an inverter linear compressor and the inverter linear compressor varies stroke to change refrigerating force so that the stroke of the compressor 100 varies and that an output is controlled, which is technically different from a method of changing the refrigerating force in accordance with the number of rotations of the inverter compressor.

The inverter circuit 220 includes a pulse varying unit 222 for outputting a variable signal whose period and phase vary with respect to the operating control signal supplied to the compressor 100 in accordance with the control signal of the controller 240, an inverter 224 for supplying the operating control signal to the compressor 100 by the variable signal applied from the pulse varying unit 222, and a measuring unit 226 for measuring the current and the voltage of the operating control signal to transmit the measured current and voltage to the controller 240.

In addition, the controller 240 receives the temperatures of the insides of the freezer compartment 31 and the refrigerator compartment 32 that are measured by the sensor unit 230 and calculates a first error temperature that is a difference between the temperature of the inside of the freezer compartment 31 and a set temperature and a second error temperature that is a difference between the temperature of the inside of the refrigerator compartment 32 and the set temperature.

Here, the controller 240 performs control so that the first and second error temperatures are compared with the maximum output temperature, first and second target temperatures, and first, second, third, and fourth temperature periods, that the stroke of the compressor 100 varies at least once in a period, and that the compressor 100 is operated.

The controller 240 includes a processor 242 for calculating a variable value for varying the stroke of the compressor 100 and an outputting unit 244 for transmitting the control signal including the variable value calculated by the processor 242 to the pulse varying unit 222.

In addition, in the refrigerator compartment 32, when the second error temperature is no more than the maximum output temperature and is in the third temperature period, the processor 242 outputs the variable value so that the stroke of the compressor 100 varies and that the compressor 100 is operated by an output between 90% and 80% for the maximum output. When the second error temperature is in the fourth temperature period, the processor 242 outputs the variable value so that the stroke of the compressor 100 varies and that the compressor 100 is operated by an output between 79% and 60% for the maximum output. When the second error temperature is in a period no more than the fourth temperature period, in the freezer compartment 31, in the case where the first error temperature is no more than the maximum output temperature and is in the first temperature period, the processor 242 outputs the variable value so that the stroke of the compressor 100 varies and that the compressor 100 is operated by an output between 95% and 85% for the maximum output. When the first error temperature is in the second temperature period, the processor 242 outputs the variable value so that the stroke of the compressor 100 varies and that the compressor 100 is operated by an output between 84% and 75% for the maximum output. When the first error temperature is in a period no more than the second temperature period, the processor 242 outputs the variable value so that the stroke of the compressor 100 varies and that the compressor 100 is operated by an output between 74% and 60% for the maximum output. When the second error temperature is in a period lower than the fourth temperature period, the processor 242 outputs the variable value so that the stroke of the compressor 100 varies and that the compressor 100 is operated by an output between 69% and 50% for the maximum output.

Figure 6:
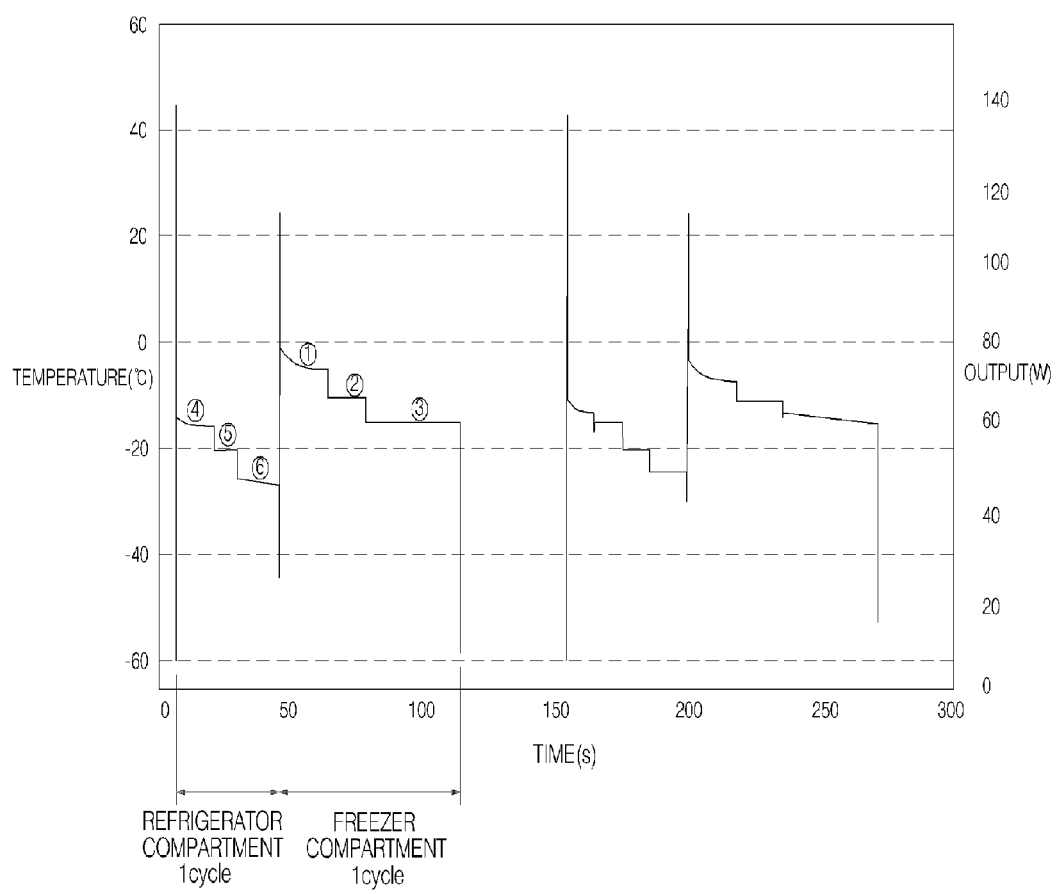
FIG. 6 is a graph illustrating that the refrigerating force of the refrigerator of FIG. 5.

FIG. 6 is a graph illustrating that the refrigerating force of the refrigerator of FIG. 5.

FIG. 6 is a table divided into a temperature ° C., an output W, and a time s to illustrate the output consumption voltage of the compressor.

That is, the compressor 100 varies an output at least once in one cycle of the freezer compartment 31 and the refrigerator compartment 32. Here, based on one cycle of the freezer compartment 31 and the refrigerator compartment 32, in the freezer compartment 31, the power consumption of the compressor 100 varies in accordance with a temperature in periods ①, ②, and ③ and, in the refrigerator compartment 32, the power consumption of the compressor 100 varies in accordance with a temperature in periods ④, ⑤, and ⑥.

Figure 7:
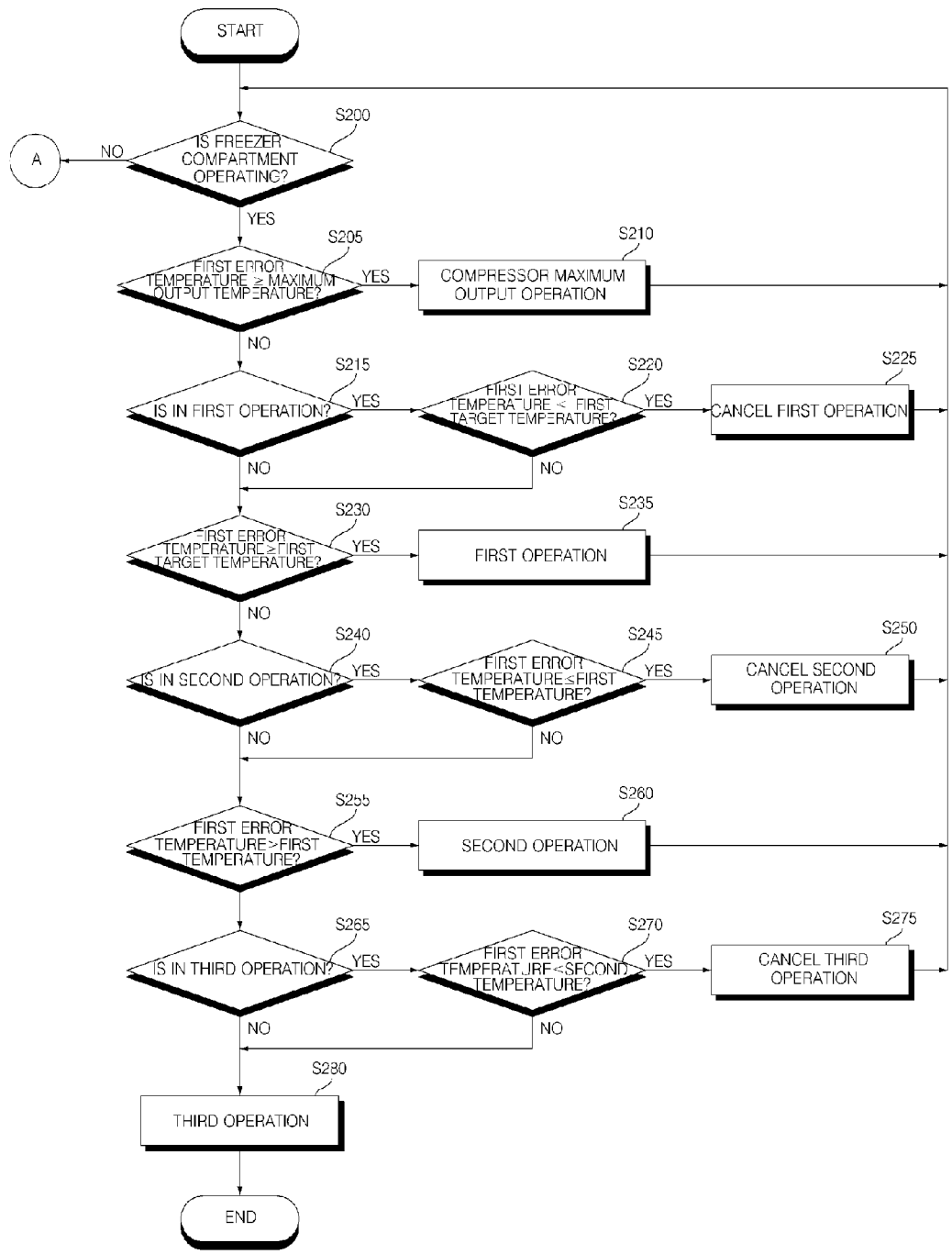
FIG. 7 is a flowchart illustrating a method of controlling a freezer compartment according to the first embodiment of the present invention.

FIG. 7 is a flowchart illustrating a method of controlling a freezer compartment according to the first embodiment of the present invention.

Referring to FIG. 7, it is determined whether there is a freezer compartment (S200).

That is, the controller 240 determines whether the operating control signal is supplied to the compressor 100 in order to operate the freezer compartment 31.

Here, when the freezer compartment 31 does not operate, it is checked whether the refrigerator compartment 32 of 'A' operates. A method of controlling the refrigerator compartment 32 will be described in detail with reference to FIG. 8.

When the freezer compartment operates, it is determined whether the first error temperature that is a difference between the temperature of the inside of the freezer compartment and the set temperature is no less than the set maximum output temperature (S205). When it is determined the first error temperature is no less than the maximum output temperature, the compressor is operated by the maximum output (S210).

That is, when the compressor 100 is operated in order to operate the freezer compartment 31, the controller 240 receives the temperature of the inside of the freezer compartment 31 measured by at least one sensor of the sensor unit 230.

Here, the controller 240 calculates the first error temperature that is a difference between the temperature of the inside of freezer compartment 31 and the set temperature and compares the set maximum output temperature with the first error temperature to operate the compressor 100 by the maximum output when the first error temperature is no less than the maximum output temperature.

The controller 240 performs control so that the stroke varies in accordance with an operation control signal supplied from the pulse varying unit 222 of the inverter circuit 220 to the compressor 100 and that the compressor 100 is operated by the maximum output.

When it is determined in S205 that the first error temperature is no more than the maximum output temperature, it is determined whether the compressor is in a first operation in accordance with a first temperature period (S215). When the compressor is in the first operation, the first error temperature is compared with the set first target temperature (S220). When it is determined that the first error temperature is no more than the first target temperature, the first operation of the compressor is cancelled (S225).

Here, in the first operation, the compressor 100 is operated by an output between 95% and 85% for the maximum output operation.

That is, the first operation belongs to a first temperature period.

Therefore, when the compressor 100 is operated by the first operation, the controller 240 compares the first error temperature with the target temperature. When the first error temperature is no more than the target temperature, the first operation is cancelled.

When it is determined in S215 that the compressor is not operated by the first operation, in the case where the first error temperature is no more than the maximum output temperature, the controller 240 determines whether the compressor 100 is operated by the first operation. It is determined whether the first error temperature is no less than the target temperature (S230). When the first error temperature is no less than the first target temperature, the compressor is operated by the first operation (S235).

That is, when the compressor 100 is not operated by the first operation, the controller 240 compares the first error temperature with the first target temperature.

At this time, the controller 240 controls the inverter circuit 220 so that the compressor 100 is operated by the first operation when the first error temperature is no less than the first target temperature.

When it is determined in S 230 that the first error temperature is no more than the target temperature, it is determined whether the compressor is operated by a second operation (S240). When the compressor is operated by the second operation, it is determined that the first error temperature is no more than a first temperature (S245). When the first error temperature is no more than the first temperature, the second operation is cancelled (S250).

That is, the controller 240 determines whether the compressor 100 is operated by the second operation through the current and voltage supplied from the inverter circuit 220 to the compressor 100.

Then, when the compressor 100 is operated by the second operation, the controller 240 determines whether the first error temperature is no more than the first temperature. When it is determined that the first error temperature is no more than the first temperature, the operation of the compressor 100 by the second operation is cancelled.

Here, in the second operation, the compressor 100 is operated by an output between 84% and 75% for the maximum output operation of the compressor 100.

That is, the second operation is in a second temperature period as illustrated in FIG. 5.

When it is determined in S240 that the compressor is not operated by the second operation, it is determined that the first error temperature is no less than the first temperature (S255). When the first error temperature is no less than the first temperature, the compressor is operated by the second operation (S260).

That is, when the compressor 100 is not operated by the second operation, the controller 240 determines that the first error temperature is no less than the first temperature. When the first error temperature is no less than the first temperature, the compressor 100 is operated by the second operation.

When it is determined in S255 that the first error temperature is smaller than the first temperature, it is determined that the compressor is in a third operation (S265). When the compressor is in the third operation, it is determined whether the first error temperature is no more than the second temperature (S270). When the first error temperature is no more than the second temperature, the third operation is cancelled (S275).

That is, when the compressor 100 is operated by the third operation, the controller 240 compares the first error temperature with the second temperature to cancel the third operation when the first error temperature is no more than the second temperature.

Here, in the third operation, the compressor 100 is operated by an output between 74% and 60% for the maximum output operation.

That is, the third operation period is lower than the second operation period.

When it is determined in S265 that the compressor is not operated by the third operation, the compressor is operated by the third operation (S280).

Figure 8:
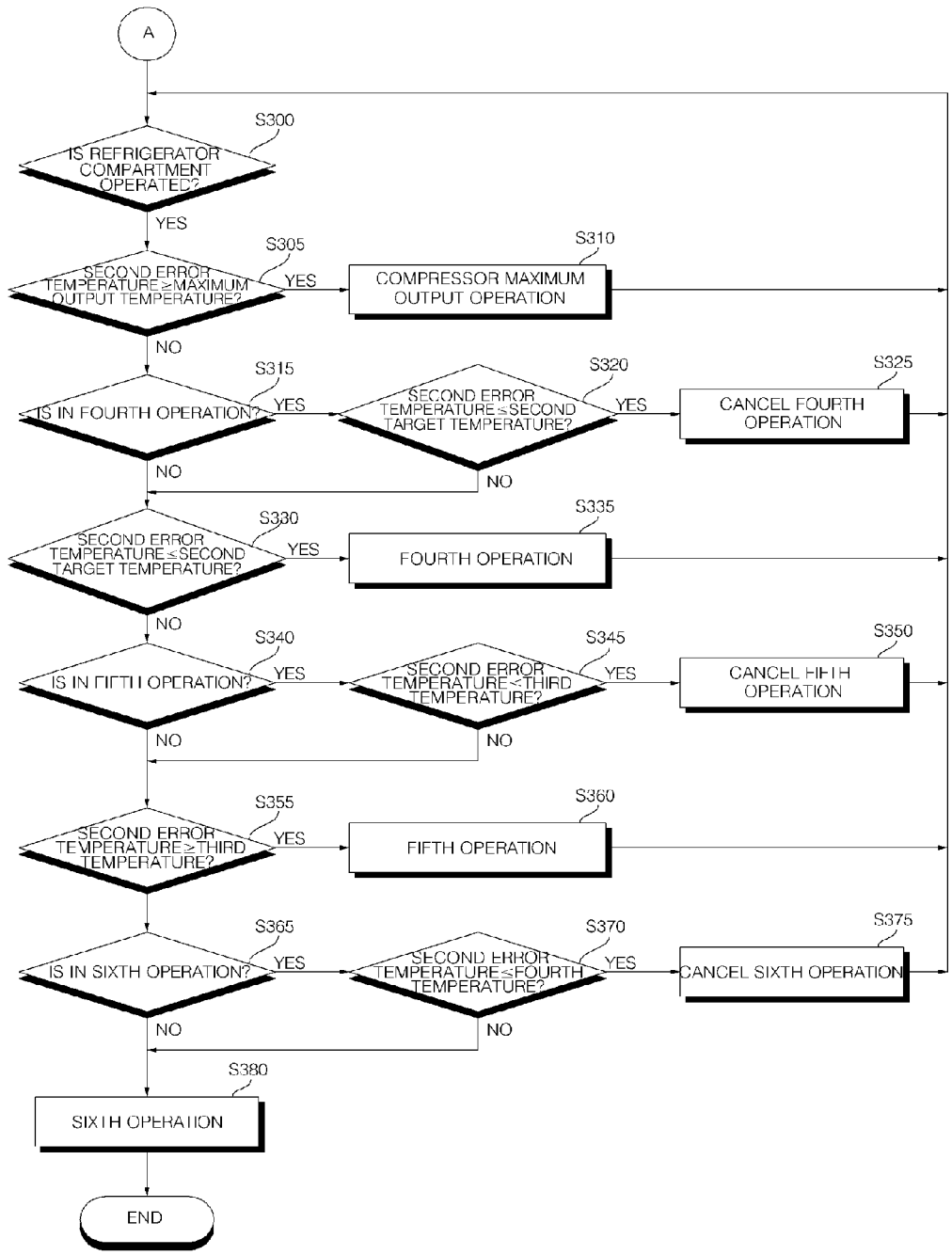
FIG. 8 is a flowchart illustrating a method of controlling a refrigerator compartment according to the first embodiment of the present invention.

FIG. 8 is a flowchart illustrating a method of controlling a refrigerator compartment according to the first embodiment of the present invention.

Referring to FIG. 8, in the refrigerator according to the present invention, it is determined whether the refrigerator compartment is operated (S300).

That is, the controller 240 determines whether the operation control signal is supplied to the compressor 100 in order to operate the refrigerator compartment 32.

Here, when the freezer compartment 31 is not operated, it is determined whether the refrigerator compartment 32 is operated.

When the refrigerator compartment is operated, it is determined whether a second error temperature that is a difference between the temperature of the inside of the refrigerator compartment and the set temperature is no less than the set maximum output temperature (S305). When it is determined that the second error temperature is no less than the maximum output temperature, the compressor is operated by the maximum output (S310).

That is, when the compressor 100 is operated in order to operate the refrigerator compartment 32, the controller 240 receives the temperature of the inside of the refrigerator compartment 31 measured by at least one sensor of the sensor unit 230.

Here, the controller 240 calculates a second error temperature that is a difference between the temperature of the inside of the refrigerator compartment 32 and the set temperature and compares the set maximum output temperature with the second error temperature to operate the compressor 100 by the maximum output when the second error temperature is no less than the maximum output temperature.

The controller 240 performs control so that the operation control signal supplied from the pulse varying unit 222 of the inverter circuit 220 to the compressor 100 and that the compressor 100 is operated by the maximum output.

When it is determined that the second error temperature is no more than the maximum output temperature, it is determined whether the compressor is in a fourth operation (S315). When the compressor is in the fourth operation, the second error temperature is compared with a second target temperature (S320). When it is determined that the second error temperature is no more than the second target temperature, the fourth operation of the compressor is cancelled (S325).

That is, when the second error temperature is no more than the maximum output temperature, the controller 240 determines whether the compressor 100 is operated by the fourth operation.

Here, in the fourth operation, the compressor 100 is operated by an output between 90% and 80% for the maximum output operation of the compressor 100.

Therefore, when the compressor 100 is operated by the fourth operation, the controller 240 compares the second error temperature with the target temperature. When the second error temperature is no more than the target temperature, the fourth operation is cancelled.

Here, the fourth operation is in a third temperature period.

When it is determined in S315 that the compressor is not operated by the fourth operation, it is determined whether the second error temperature is no less than the second target temperature (S330). When the second error temperature is no more than the second target temperature, the compressor is operated by the fourth operation (S335).

That is, when the compressor 100 is not operated by the fourth operation, the controller 240 compares the second error temperature with the target temperature.

At this time, the controller 240 controls the inverter circuit 220 so that the compressor 100 is operated by the fourth operation when the second error temperature is no less than the target temperature.

When it is determined in S330 that the second error temperature is no more than the second target temperature, it is determined whether the compressor is operated by a fifth operation (S340). When the compressor is operated by the fifth operation, it is determined the second error temperature is no more than a third temperature (S345). When the second error temperature is no more than the third temperature, the fifth operation is cancelled (S350).

That is, the controller 240 determines whether the compressor 100 is operated by the fifth operation through the current and voltage supplied from the inverter circuit 220 to the compressor 100.

When the compressor 100 is operated by the fifth operation, the controller 240 determines whether the second error temperature is no more than the third temperature. When it is determined that the second error temperature is no more than the third temperature, the operation of the compressor 100 by the fifth operation is cancelled.

Here, in the fifth operation, the compressor 100 is operated by an output between 79% and 60% for the maximum output operation of the compressor 100.

In addition, the fifth operation is in a fourth temperature period.

When it is determined in S340 that the compressor is not operated by the fifth operation, it is determined whether the second error temperature is no less than the third temperature (S355). When the second error temperature is no less than the third temperature, the compressor is operated by the fifth operation (S260).

That is, when the compressor 100 is not operated by the fifth operation, the controller 240 determines whether the second error temperature is no less than the third temperature. When the second error temperature is no less than the third temperature, the compressor 100 is operated by the fifth operation.

When it is determined in S355 that the second error temperature is smaller than the third temperature, it is determined whether the compressor is in a sixth operation (S365). When the compressor is in the sixth operation, it is determined whether the second error temperature is no more than a fourth temperature (S370). When the second error temperature is no more than the fourth temperature, the sixth operation is cancelled (S375).

That is, when the compressor 100 is operated by the sixth operation, the controller 240 compares the second error temperature with the fourth temperature. When the second error temperature is no more than the fourth temperature, the sixth operation is cancelled.

Here, in the sixth operation, the compressor 100 is operated by an output between 69% and 50% for the maximum output operation of the compressor 100.

That is, the sixth operation is a temperature period that belongs to a period no more than the fourth temperature period.

When it is determined in S365 that the compressor is not operated by the sixth operation, the compressor is operated by the sixth operation (S280).

In the refrigerator according to the present invention and the method of controlling the same, the temperatures of the insides of the freezer compartment and the refrigerator compartment, the error temperature of the set temperature, and the set temperature are compared with each other and the output of the compressor varies at least once in one period based on the comparison result so that it is possible to reduce the power consumption of the compressor.

Although embodiments of the present invention have been described with reference to drawings, these are merely illustrative, and those skilled in the art will understand that various modifications and equivalent other embodiments of the present invention are possible. Consequently, the true technical protective scope of the present invention must be determined based on the technical spirit of the appended claims.

Industrial Applicability

In the refrigerator according to the present invention and the method of controlling the same, the output of the compressor can be controlled to vary at least once in one period based on the error temperature between the temperatures of the insides of the freezer compartment and the refrigerator compartment and the set temperature so that power consumption for maintaining the refrigerating force of the freezer compartment and the refrigerator compartment can be reduced, that power required for a user to use a product is reduced, and that productivity and efficiency are improved.

The invention claimed is:

1. A method of controlling a refrigerator, in which a difference between a temperature of an inside of a freezer compartment and a predetermined temperature is referred to as a first error temperature and a difference between a temperature of an inside of a refrigerator compartment and the predetermined temperature is referred to as a second error temperature, the method comprising:

varying a stroke of an inverter linear compressor to operate the inverter linear compressor by a maximum output when the first or second error temperature is higher than a maximum output temperature; and varying the stroke of the inverter linear compressor at least once in a single freezer or refrigerator cycle to operate the inverter linear compressor when the first or second error temperature is not more than the maximum output temperature, wherein, in the varying the stroke of the inverter linear compressor at least once in the single freezer or refrigerator cycle, when the first error temperature is not more than the maximum output temperature and when the second error temperature is not more than the maximum output temperature, a first period of one cycle of the freezer compartment follows a second period of one cycle of the refrigerator compartment, wherein the first period is longer than the second period, and wherein a first output power of the inverter linear compressor during the first period is greater than a second output power of the inverter linear compressor during the second period.

2. The method of claim 1, further comprising:

determining whether one of the freezer compartment and the refrigerator compartment is operated before varying the stroke of the inverter linear compressor to operate the inverter linear compressor by the maximum output when the first or second error temperature is higher than the maximum output temperature; and measuring a temperature of an inside of the operated one of the freezer compartment and the refrigerator compartment based on the determination result.

3. The method of claim 1, wherein, in the varying the stroke of the inverter linear compressor at least once in the single freezer or refrigerator cycle to operate the inverter linear compressor when the first or second error temperature is not more than the maximum output temperature, the stroke of the inverter linear compressor varies to vary an output when the first error temperature is in a first temperature period higher than a first target temperature based on the first target temperature and is in a second temperature period lower than the first target temperature or when the second error temperature is in a third temperature period higher than a second target temperature based on the second target temperature and is in a fourth temperature period lower than the second target temperature.

4. The method of claim 3, wherein when the first error temperature is in the first temperature period, the inverter linear compressor is operated by an output between 95% and 85% for the maximum output of the inverter linear compressor.

5. The method of claim 3, wherein when the first error temperature is in the second temperature period, the inverter linear compressor is operated by an output between 84% and 75% for the maximum output of the inverter linear compressor.

6. The method of claim 3, wherein when the second error temperature is in the third temperature period, the inverter linear compressor is operated by an output between 90% and 80% for the maximum output of the inverter linear compressor.

7. The method of claim 3, wherein when the second error temperature is in the fourth temperature period, the inverter linear compressor is operated by an output between 79% and 60% for the maximum output of the inverter linear compressor.

8. The method of claim 3, wherein when the first error temperature is in a period lower than the second temperature period, the inverter linear compressor is operated by an output between 74% and 60% for the maximum output of the inverter linear compressor.

9. The method of claim 3, wherein when the second error temperature is in a period lower than the fourth temperature period, the inverter linear compressor is operated by an output between 69% and 50% for the maximum output of the inverter linear compressor.

10. A refrigerator, comprising:

an inverter circuit that supplies an operation control signal so that an inverter linear compressor is operated;

a sensor device comprising at least one sensor that measures temperatures of insides of a freezer compartment and a refrigerator compartment; and a controller that supplies a control signal to the inverter circuit so that a stroke of the inverter linear compressor varies at least once in a single freezer or refrigerator cycle so that the inverter linear compressor is operated when a first error temperature of the freezer compartment or a second error temperature of the refrigerator compartment is not more than a maximum output temperature, wherein, in the varying the stroke of the inverter linear compressor at least once in the single freezer or refrigerator cycle, when the first error temperature is not more than the maximum output temperature and when the second error temperature is not more than the maximum output temperature, a first period of one cycle of the freezer compartment follows a second period of one cycle of the refrigerator compartment, wherein the first period is longer than the second period, and wherein a first output power of the inverter linear compressor during the first period is greater than a second output power of the inverter linear compressor during the second period.

11. The refrigerator of claim 10, wherein the inverter circuit comprises:

a pulse varying device that varies the operation control signal in accordance with the control signal;

an inverter that supplies a power source to the inverter linear compressor in accordance with the operation control signal; and a measuring device that measures the power source supplied to the inverter linear compressor.

12. The refrigerator of claim 10, wherein the first error temperature is a difference between the temperature of the inside of the freezer compartment and a predetermined temperature, and wherein the second error temperature is a difference between the temperature of the inside of the refrigerator compartment and the predetermined temperature.

13. The refrigerator of claim 10, wherein the controller outputs the control signal so that the stroke of the inverter linear compressor varies and the inverter linear compressor is operated by a maximum output when the first and second error temperatures are not less than the maximum output temperature.

14. The refrigerator of claim 10, wherein when the first error temperature is not more than the maximum output temperature and is in a first temperature period higher than a first target temperature based on the first target temperature, the controller outputs the control signal so that the stroke of the inverter linear compressor varies and that the inverter linear compressor is operated by an output between 95% and 85% for the maximum output.

15. The refrigerator of claim 10, wherein when the first error temperature is not more than the maximum output temperature and is in a second temperature period lower than a first target temperature based on the first target temperature, the controller outputs the control signal so that the stroke of the inverter linear compressor varies and that the inverter linear compressor is operated by an output between 84% and 75% for the maximum output.

16. The refrigerator of claim 10, wherein when the second error temperature is not more than the maximum output temperature and is in a third temperature period higher than a second target temperature based on the second target temperature, the controller outputs the control signal so that the stroke of the inverter linear compressor varies and that the inverter linear compressor is operated by an output between 90% and 80% for the maximum output.

17. The refrigerator of claim 10, wherein when the second error temperature is not more than the maximum output temperature and is in a fourth temperature period lower than a second target temperature based on the second target temperature, the controller outputs the control signal so that the stroke of the inverter linear compressor varies and that the inverter linear compressor is operated by an output between 79% and 60% for the maximum output.

18. The refrigerator of claim 15, wherein when the first error temperature is in a period lower than the second temperature period, the controller outputs the control signal so that the stroke of the inverter linear compressor varies and that the inverter linear compressor is operated by an output between 74% and 60% for the maximum output.

19. The refrigerator of claim 17, wherein when the second error temperature is in a period lower than the fourth temperature period, the controller outputs the control signal so that the stroke of the inverter linear compressor varies and that the inverter linear compressor is operated by an output between 69% and 50% for the maximum output.

* * * * *